United States Patent [19]

Markham

[11] Patent Number: 5,678,978
[45] Date of Patent: Oct. 21, 1997

[54] APPARATUS FOR A TILTABLE ROLLOFF TRAILER HAVING A DISPLACABLE FRAME

[75] Inventor: Gary R. Markham, Lumberton, Tex.

[73] Assignee: Modern, Inc., Beaumont, Tex.

[21] Appl. No.: 417,659

[22] Filed: Apr. 5, 1995

[51] Int. Cl.$^6$ ............................................. B60P 1/32
[52] U.S. Cl. ........................... 414/477; 414/482; 414/491
[58] Field of Search .................... 414/477–480, 414/482, 491, 494, 500, 559, 679; 298/12, 17.5, 17.8

[56] References Cited

U.S. PATENT DOCUMENTS

| | | | |
|---|---|---|---|
| 1,455,821 | 5/1923 | Swanson | 414/477 X |
| 1,797,344 | 3/1931 | Hughes et al. | 298/17.5 X |
| 2,065,833 | 12/1936 | Stratton et al. | 414/477 |
| 2,786,590 | 3/1957 | Edwards et al. | 414/477 |
| 2,867,339 | 1/1959 | Nelson | 414/500 X |
| 3,414,148 | 12/1968 | Bishop | 414/477 |
| 3,430,792 | 3/1969 | Grove et al. | 414/477 |
| 3,724,695 | 4/1973 | Taylor . | |
| 4,079,996 | 3/1978 | Vansickle . | |
| 4,318,657 | 3/1982 | Znidaric | 414/494 X |
| 4,529,349 | 7/1985 | Lutz | 414/478 |
| 4,704,062 | 11/1987 | Hale | 414/494 |
| 4,943,118 | 7/1990 | Davis | 298/12 |
| 4,986,719 | 1/1991 | Galbreath | 414/478 |
| 5,088,875 | 2/1992 | Galbreath et al. | 414/478 |
| 5,183,371 | 2/1993 | O'Daniel | 414/477 |
| 5,601,393 | 2/1997 | Waldschmitt | 414/491 X |

FOREIGN PATENT DOCUMENTS

| | | | |
|---|---|---|---|
| 0194954 | 9/1986 | European Pat. Off. | 414/477 |
| 0336313 | 10/1989 | European Pat. Off. | 414/477 |

OTHER PUBLICATIONS

PMF Rentals Ltd.; Sales Brochure Entitled "Manufacturing of Roll–Off Equipment—Two Container Semi–Trailer AKA—Rocket Launcher", undated.

Galbreath Incorporated; Sales Brochure Entitled "AC & AD–416 Trailers", Feb. 1993.

Gaylean Equipment Co., Inc.; Sales Brochure Entitled "For Unsurpassed Quality in Custom Built Roll Off Trailers", undated.

Clement; Sales Brochure Entitled "ROT 4246 Frame Type Roll Off Trailer", undated.

Clement; Sales Brochure Entitled "Creating Solutions to Transporting Problems", undated.

*Primary Examiner*—James W. Keenan
*Attorney, Agent, or Firm*—Pravel, Hewitt, Kimball & Krieger

[57] ABSTRACT

A method and apparatus for a vehicle mounted rolloff hoist having a tiltable frame. The apparatus provides a releasable hinge connection at the rear ends of a base frame and a rolloff frame enabling the operator to select a pivot point which provides for ground contact. The apparatus also permits the operator, once the tiltable frame is in a substantially horizontal position, to disengage the hinge point and advance the rolloff frame on top of the base frame in a lateral direction, securing the rolloff frame within the base frame. At that point, the hinge connection is reattached, and the rolloff frame is secured within the base frame. The result is an improved method and apparatus of a vehicle mounted tiltable rolloff trailer which provides for optimum load distribution, stability and clearance requirements.

11 Claims, 6 Drawing Sheets

APPARATUS FOR A TILTABLE ROLLOFF TRAILER HAVING A DISPLACABLE FRAME

BACKGROUND OF THE INVENTION

1. Field of the Invention

The present invention relates to a method and apparatus of an improved tiltable rolloff trailer. More specifically, the present invention is a method and apparatus of an improved rolloff trailer having a displacable rolloff frame which is releasably hinged to a base frame.

2. Description of the Prior Art

Current trailer rolloff configurations include a top rolloff frame and a base frame which are permanently hinged near the rear end of the trailer configuration. The rolloff frame may include a displacable rear end portion adapted to telescope out and contact the ground when the rolloff frame is pivoted relative to the base frame or it may displace the tilt frame relative to a fixed hinge point. See, U.S. Pat. No. 4,529,349. Since the rolloff frames of the prior art are fixedly hinged to the base frame, an extra extension, or other slidable carriage, is required for the rear end of the rolloff frame to touch the ground surface to provide the support necessary to load and unload a container. Such prior art configurations are complex. See also, U.S. Pat. Nos. 4,986,719 and 5,088,875.

Therefore, the need exists for an improved method and apparatus for loading and unloading a container which does not require an extension member or similar structure.

Additionally, the need exists for an improved trailer configuration which comprises a simplified rolloff frame suitable for lateral movement once pivotal rotation is completed. Such an improved configuration would also permit the container to be advanced forward thereby distributing the loads between the axles of the trailer and the axle of the tractor. In this manner, federal, state and local regulations relating to the distribution of loads between the front and rear axle systems can be complied with. Such redistribution also provides an improved center of gravity which is more forward and lower.

Thus, the need exists for an improved method and apparatus for loading and unloading containers from a tiltable rolloff trailer.

SUMMARY OF THE INVENTION

Briefly, the apparatus relates to an improved vehicle mounted rolloff hoist for loading, transporting and unloading containers having a base frame which is preferably towed by a tractor. The base frame includes a forward end and a rear end. The forward end would attach to the tractor; a wheel assembly is located proximate the rear end. A rolloff frame, also having a forward end and a rear end, is releasably hinged at a pivot point proximate the rear end of the rolloff frame and the rear end of the base frame. The hinge connection is releasable and displacable between an engaged position for which a pivot point is established and a disengaged position in which the rear ends of the rolloff frame and the base frame are unconnected. The apparatus also includes means for longitudinally displacing the rolloff frame relative to the base frame once the hinge connection is disengaged. The apparatus also includes means for pivoting the rolloff frame relative to the base frame once the hinge connection is engaged. Preferably, the longitudinal displacing system and the pivotal displacing system are hydraulic cylinders and a single set of hydraulic cylinders may serve both functions—longitudinal displacement and pivotal movement. The improved apparatus also includes a system for securing and locking the forward ends of the rolloff frame and the base frame as the rolloff frame is advanced forward engaging the forward end of the base frame.

The improved method for loading, transporting and unloading containers uses a vehicle mounted rolloff hoist having a base frame, a rolloff frame pivotally connected to the base frame, a releasable hinge pivotally connecting the rolloff frame to the base frame, means for pivoting the rolloff frame relative to the base frame, and means for longitudinally displacing the rolloff frame relative to the base frame. In unloading a container, the releasable hinge at the rear ends of the rolloff frame and the base frame is first disengaged. The rolloff frame is then moved rearwardly relative to the base frame by the displacing means. Thus, the forward ends of the rolloff frame and the base frame are unlocked, permitting pivotal movement of the rolloff frame relative to the base frame. Once the desired lateral displacement is achieved, the releasable hinge is activated, connecting the rear ends of the rolloff frame and the base frame. In this manner, the rolloff frame is again hinged relative to the base frame. The pivoting means are then engaged pivoting the rolloff frame from a substantially horizontal position to an inclined position. At that point, the container may be lowered from the rolloff frame to the ground surface.

To onload a container, the reverse sequence occurs. That is, with the releasable hinge engaged, the rolloff frame is pivoted relative to the base frame. The container is then advanced forwardly onto the rolloff frame by a hoist or other mechanism. Once in position on the rolloff frame, or alternatively as the container is being raised onto the rolloff frame, the rolloff frame is pivoted onto the base frame. Once in a substantially horizontal position, the hinge connection is released thereby eliminating the pivot point. The displacing means is then activated advancing the rolloff frame forward relative to, and substantially parallel with, the base frame. As the rolloff frame is advanced forward, the forward end of the rolloff frame engages the forward end of the base frame so as to secure the rolloff frame within the base frame prohibiting any pivotal movement of the rolloff frame relative to the base frame. Once the desired amount of forward movement is achieved providing for the proper load distribution between the wheel assembly of the base frame and the wheel assembly of the tractor, the releasable hinge is activated providing a hinged and fixed connection proximate the rear ends of the base frame and the rolloff frame.

The more important features of this invention have been summarized rather broadly in order that the detailed description may be better understood. There are, of course, additional features of the invention which will be described hereafter which will also form the subject of the claims appended hereto.

BRIEF DESCRIPTION OF THE DRAWINGS

In order to more fully describe the drawings used in the detailed description of the present invention, a brief description of each drawing is provided.

DETAILED DESCRIPTION OF PREFERRED EMBODIMENT

Figure 1:
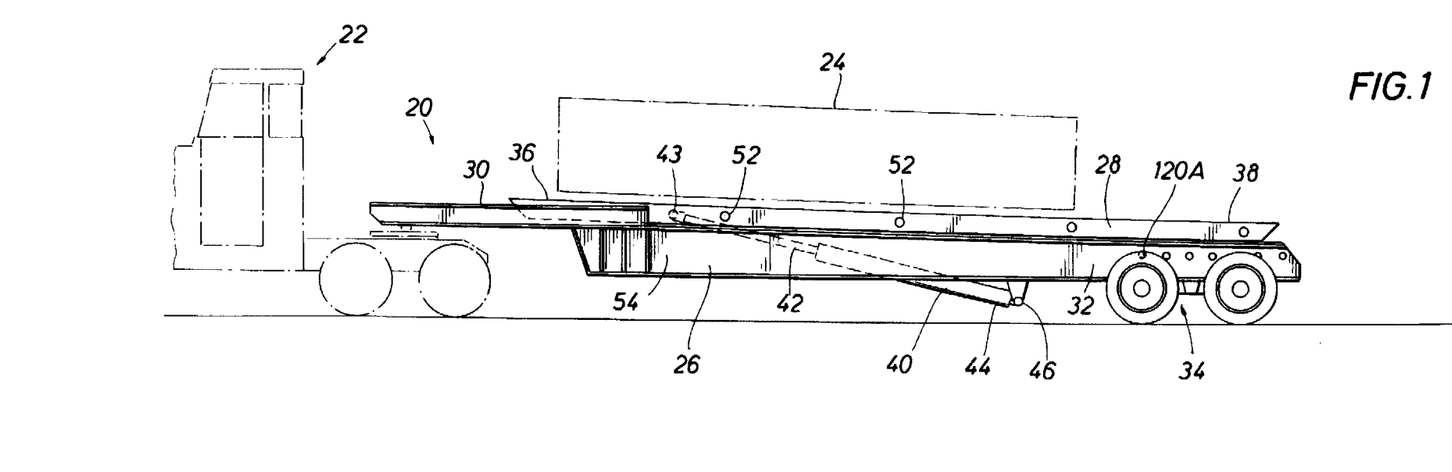
FIG. 1 is a plan view of the present invention with the rolloff frame in a forward position within the base frame and supporting a container.
Figure 2:
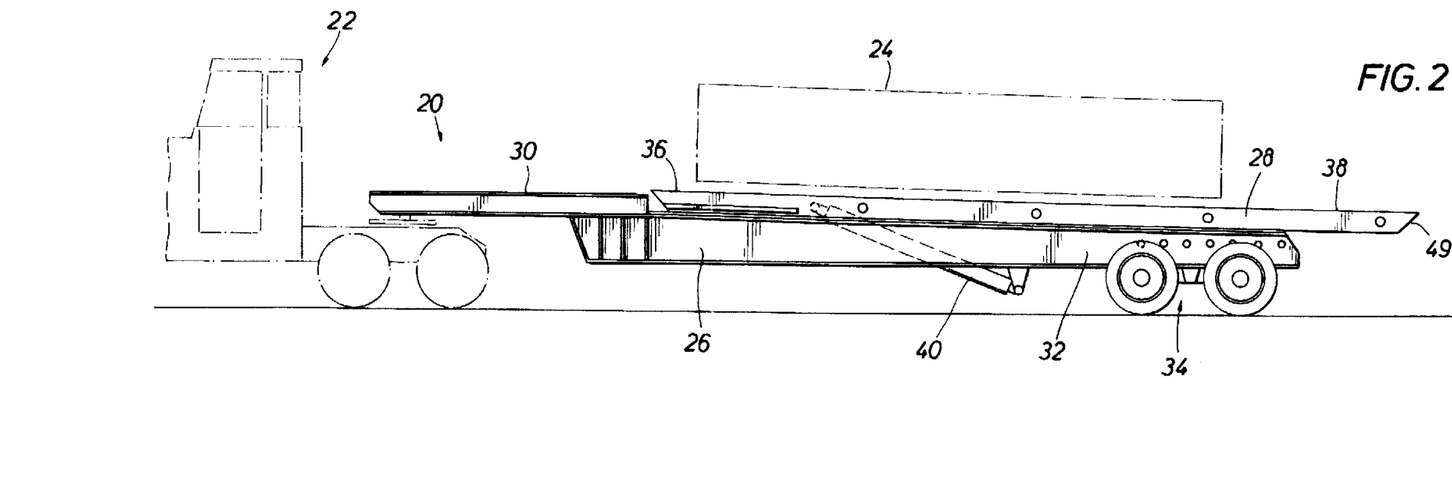
FIG. 2 is an elevation view of the present invention with the rolloff frame in a rearward position.
Figures 3, 13:
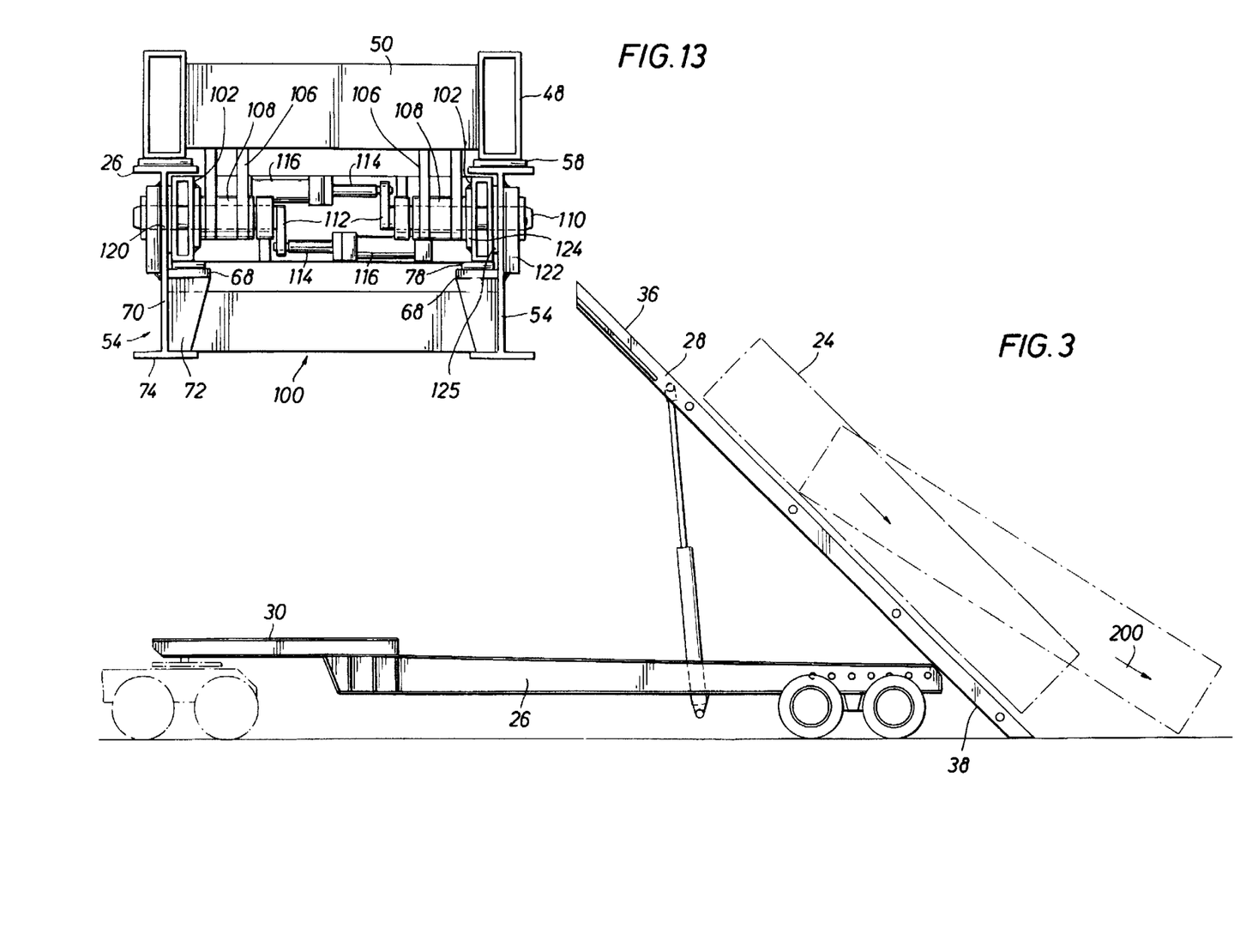
FIG. 3 is an elevation view of the present invention with the rolloff frame in a pivoted or inclined position unloading the container.
FIG. 13 is a detailed end view of FIG. 11.

Referring to FIGS. 1–3, a trailer 20 is shown attached to a tractor 22 and supporting a container 24. The trailer 20 comprises a base frame 26 and a top or rolloff frame 28. The base frame 26 includes a forward end 30 and a rear end 32. The forward end 30 is attached to the tractor and the rear end 32 includes wheeled assembly 34. Rolloff frame 28 also includes a forward end 36 and a rear end 38. Referring still to FIG. 1, the present invention includes a system 40 to displace the rolloff frame 28 relative to the base frame 26. System 40 comprises a hydraulic cylinder 44 having a displacable piston 42. The hydraulic cylinder 44 is fixed at one end 46 to base frame 26 and the piston 42 is fixed at one end 43 to rolloff frame 28.

Also referring to FIGS. 4–8, rolloff frame 28 includes substantially parallel track members 48 connected by lateral members 50 interspersed along the length of rolloff frame 28. Rollers 52 are attached to the outside edge of each track member 48 and are dispersed along the length of each track member 48 as shown in FIGS. 1 and 2, preferably at about 6–8 foot intervals. As shown by phantom lines in FIG. 8, the container 24 preferably would include corresponding contact track members 25 that engage and roll upon rollers 52 permitting the easy loading and unloading of container 24 on and off rolloff frame 28 in accordance with the description provided herein. Preferably, rollers 52 are recessed below the top surface of each track member 48 providing a ledge which laterally restrains the container 24 during loading, unloading and transporting. The vertical displacement of rollers 52 relative to members 48 also serves to provide a guide for the proper alignment of container 24 on rolloff frame 28 during loading and unloading.

Still referring to FIGS. 1–8 and FIGS. 4–8 in particular, base frame 26 is preferably comprised of two longitudinal members 54 which are attached to one another by lateral brace members 56 that are dispersed along the length of members 54. Members 54 are separated a distance which coincides with the separation of track members 48 of rolloff frame 28 thereby enabling the sliding engagement of track members 48 on top of, and relative to, members 54. Preferably, a Teflon® plate 58, or similar low friction product, is attached to the top of each member 54 and/or the bottom of each member 48. In this manner, tracks 48 move more easily along the top of each member 54 minimizing friction during lateral displacement of the rolloff frame relative to the base frame as disclosed herein.

Referring to FIGS. 4–8 in particular, the forward end 30 of base frame 26 includes a pair of outwardly displaced longitudinal members 55 which are parallel to one another and to members 54. Members 55 are attached to, and fixed relative to, members 54 by horizontal plates 57 which are attached to the bottom of each member 55 and the top of each member 54. Vertical support is also provided by interior web members 59 which serve to stiffen member 54 and transfer load to members 54 from members 55.

Figure 6:
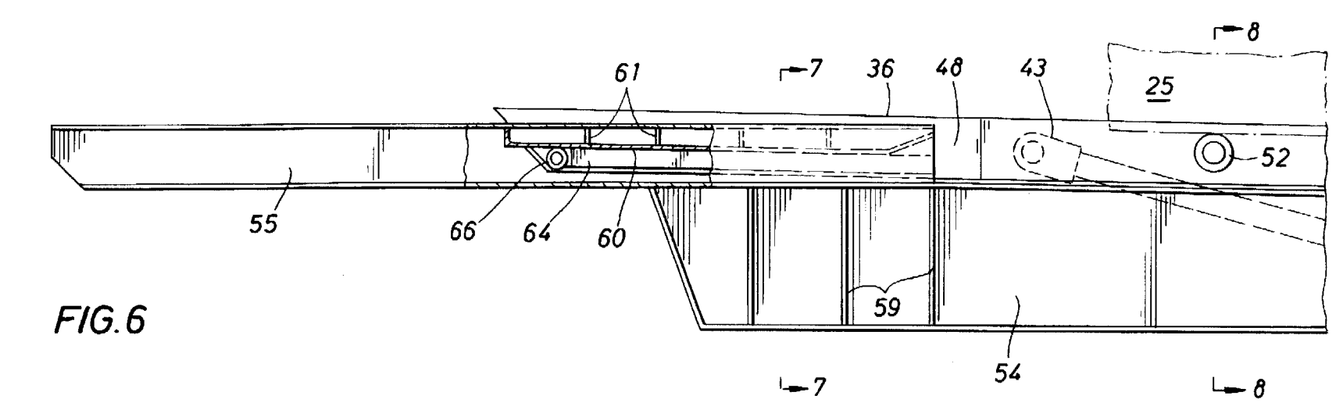
FIG. 6 is a detailed elevation view of the forward ends of the rolloff frame and the base frame in an engaged position.
Figure 7:
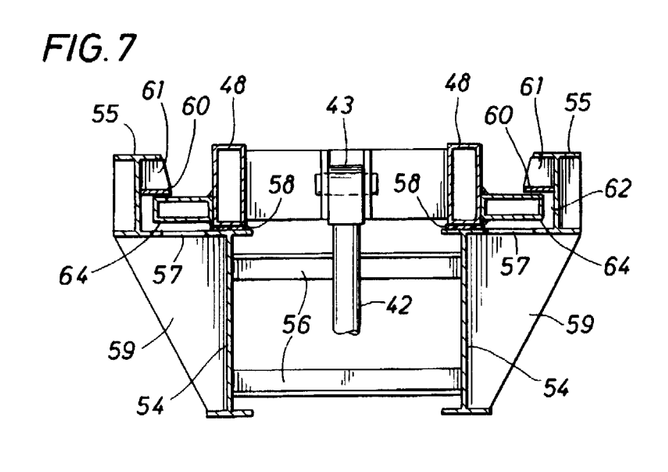
FIG. 7 is a cross-sectional view taken along line 7—7 of FIG. 6.
Figure 8:
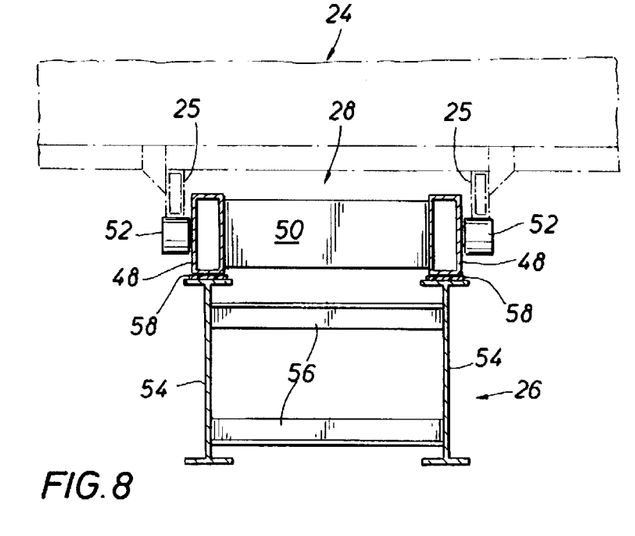
FIG. 8 is a cross-sectional view taken along line 8—8 of FIG. 6.

Referring to FIGS. 6 and 7 in particular, a planar member 60 is attached to the interior web portion of each member 55. Vertical stiffeners 61 attach planar member 60 to the web and top flange of member 55. As shown in FIG. 6, planar member 60 is oriented at a slightly rearward inclination with respect to member 55. As discussed below, this inclination helps to secure the rolloff frame within the lower frame and provides additional height clearance for the contents of container 24. In this manner, a space or opening 62 is defined within the forward end of base member 26 which is adapted to engage the forward end of rollable frame 28 as discussed below.

Figure 4:
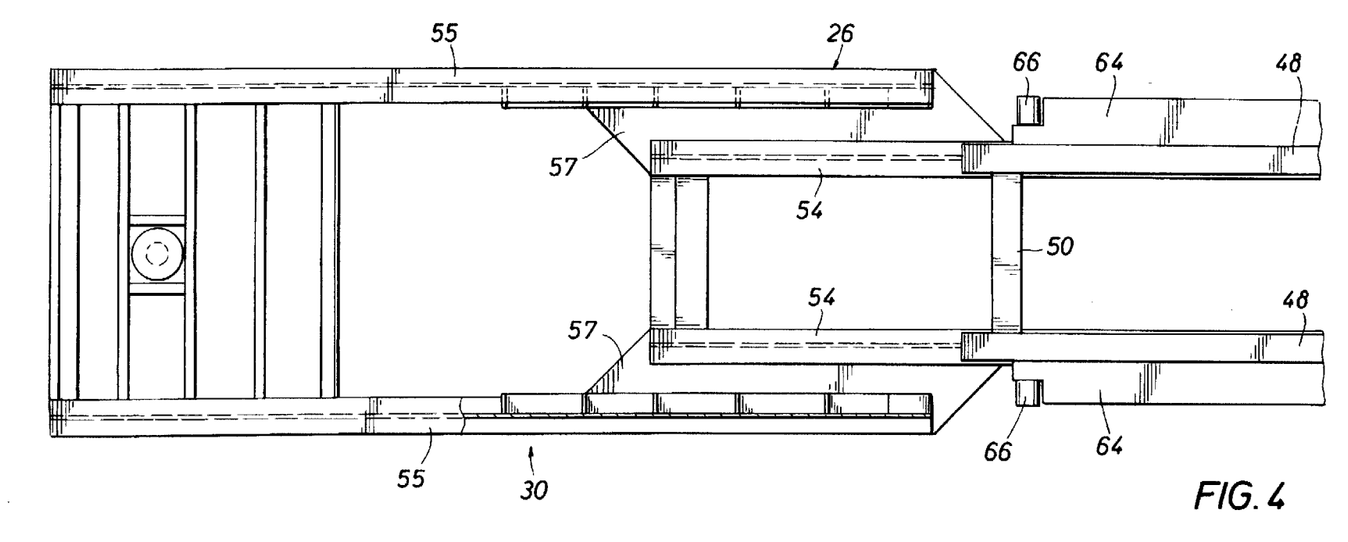
FIG. 4 is a detailed plan view of the forward ends of the rolloff frame and the base frame in a disengaged position.
Figure 5:
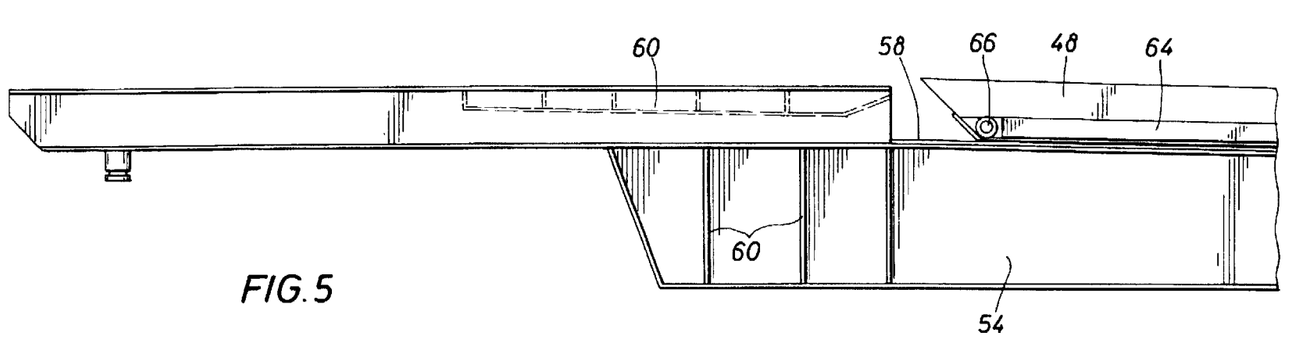
FIG. 5 is a detailed elevation view of the forward ends of the rolloff frame and the base frame in the disengaged position of FIG. 4.

Referring still to FIGS. 6–7, the forward end 36 of rolloff frame 28 includes a pair of box members 64, each attached to the lower outer edge of a member 48 and oriented substantially parallel with each member 48. A roller 66 is mounted to the forward portion of each member 64 as shown in FIGS. 4–5. Thus, as the forward end 36 of rolloff frame 26 advances forwardly on top of base frame 28, each roller 66 enters opening 62 and first engages the bottom of a planar member 60 at the forward end 30 of base frame 26. As the rolloff frame 28 is advanced forward by hydraulic cylinder 44, each box member 64 begins to contact the bottom surface of a planar member 60 and the rolloff frame is thereby secured vertically within the forward end of the base frame prohibiting pivotal movement of the rolloff frame relative to the base frame. Only one piston 42/hydraulic cylinder 44 is shown in FIG. 7. However, obviously one or more cylinders may be used depending on the load requirements. Due to the inclination of planar member 60, the top surface of rolloff frame 28 is also inclined slightly upwardly as it engages planar member 60 and advances forward, as shown in FIGS. 1 and 6. This serves to assist in securing the rolloff frame within the base frame and to lower the center of gravity of container 24, base frame and rolloff frame approximately 6–8 inches toward rear ends 32 and 38 of base frame and rolloff frame, respectfully, as described in more detail below.

Referring now to FIGS. 9–13, the releasable nature of the hinge connection of the rear ends of the base frame 26 and rolloff frame 28 will be described. A horizontal plate 68 is attached to the inner surface of web 70 of member 54. Each plate 68 is attached at the rear portion of base frame 26 only and is aligned to be substantially parallel within the top flange 76 (see FIG. 13) of member 54. Each plate 68 is also vertically supported by support plates 72 which are attached to the bottom of plate 68, the side of web 70 and to lower flange 74 of member 54.

Figure 9:
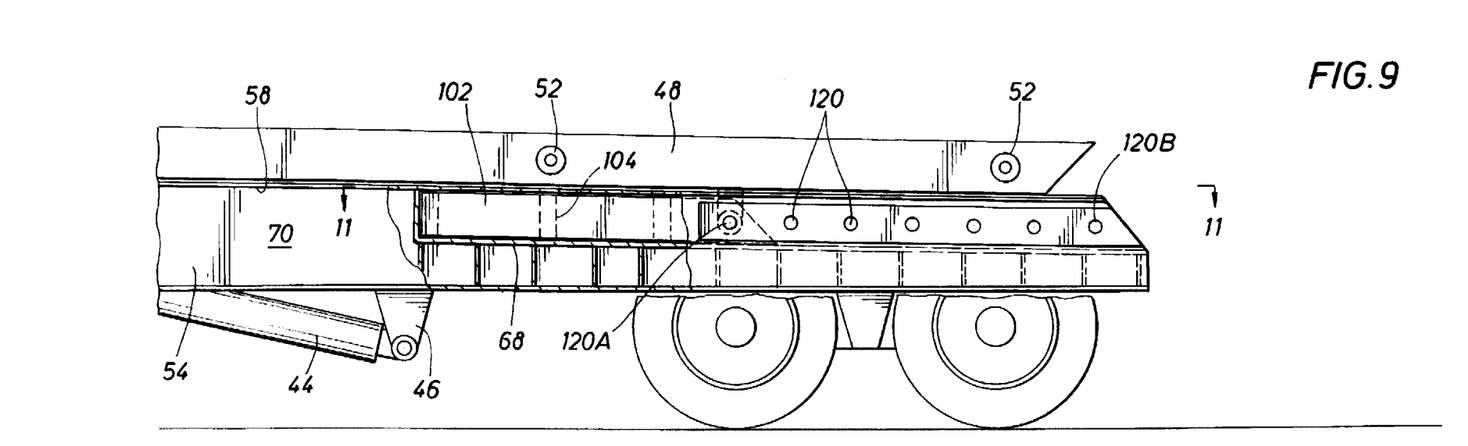
FIG. 9 is a detailed elevation view of the rear ends of the rolloff frame and the base frame in the forward engaged position.

As shown in FIGS. 2 and 9, member 54 has a slightly tapering configuration toward the rear end 32 of base frame 26. This tapered configuration in combination with the tapered orientation of planar members 60 at the forward end of base frame 26 serves to lower the top of the rolloff frame closer to the road surface, providing additional height clearance for the contents of container 24. Preferably, the height of member 54 is 6-8 inches less at the rear end 32 of base frame 26 than at its other end. This reduction in height also serves to lower the center of gravity of trailer 20, container 24 and the contents of container 24.

Figure 10:
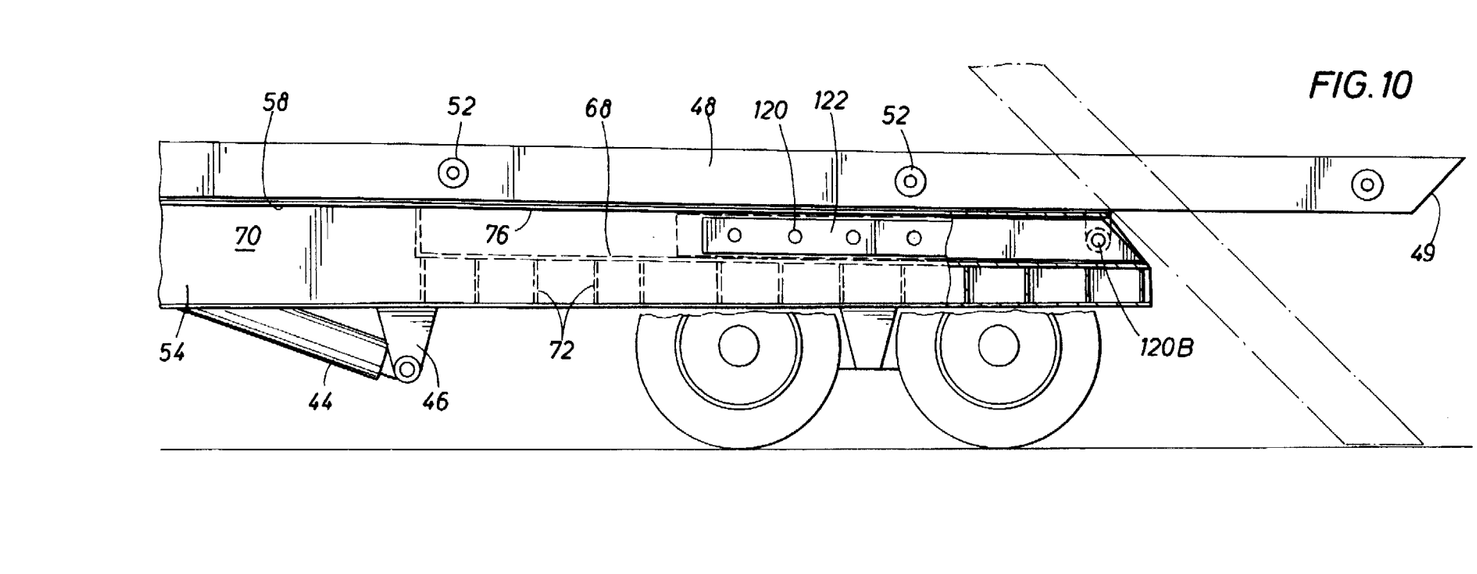
FIG. 10 is a detailed elevation view of the rear ends of the rolloff frame and the base frame in the rearward, or disengaged, position with a hinged connection established for pivotal movement of the rolloff frame relative to the base frame.
Figure 11:
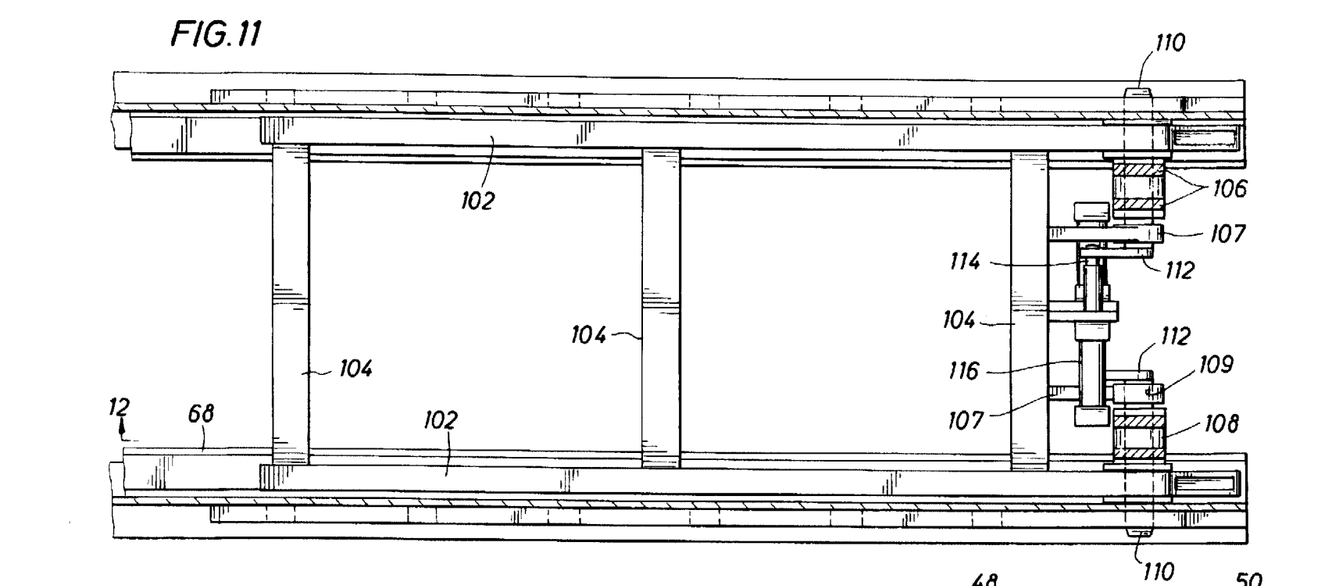
FIG. 11 is a detailed plan view of the rear ends of the rolloff frame and the base frame in the rearward position.
Figure 12:
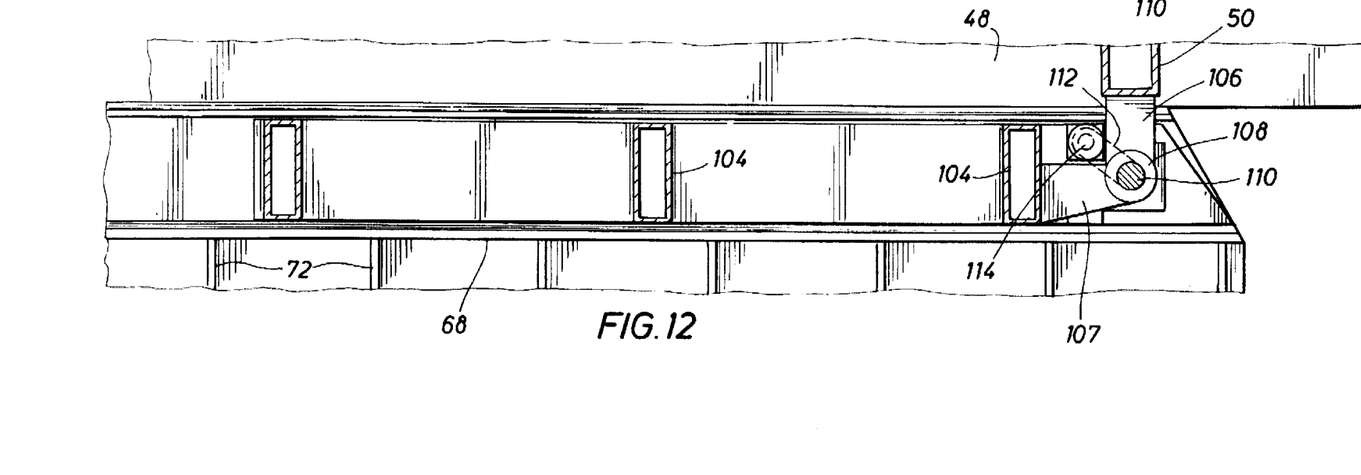
FIG. 12 is a cross-sectional view taken along line 12—12 of FIG. 11.

The releasable nature of the hinge connection is provided through a system 100 as shown in FIGS. 9-13. System 100 comprises substantial parallel track members 102 which are adapted to slide upon a Teflon® pad 78, or similar low friction pad, that is preferably attached to the top surface of each plate 68. Tracks 102 are interconnected to one another and laterally braced by members 104. Tracks 102 are fixed to rolloff frame 28 by means of plates 106 and 107. As shown in FIGS. 12 and 13, plates 106 are attached to the rearward lateral member 50 of rolloff frame 28 and extend downwardly attached at their other end to a housing 108. Housing 108 is preferably a cylindrical member supporting a pin 110 adapted to move in a direction parallel with the longitudinal axis of housing 108. In other words, each pin 110 moves in a direction substantially normal to the longitudinal axes of members 48 and 54. Each plate 107 has an aperture 109 through which a corresponding pin 110 passes. At its other end, each plate 107 is attached to rear brace member 104 of system 100. In this manner, system 100 is fixed to rolloff frame 28.

Referring still to FIGS. 11-13, the inside end of each pin 110 is attached to a displacing bar 112. The other end of each displacing bar 112 is attached to a piston 114 of a hydraulic cylinder 116. As shown in FIGS. 11-13, hydraulic cylinders 116 are located above one another. Thus, bars 112 are at a 45 degree angle to accommodate clearance requirement and to effectively displace pins 110.

Referring also to FIGS. 9 and 10, web 70 of member 54 includes a series of apertures 120 spaced at approximately 6-12 inch intervals for a distance of approximately 6-8 feet depending upon the length of the trailer and the needs of the operator. A plate 122 may be attached to the outer surface of each web 70 to provide additional stiffening and rigidity to member 54 which may be beneficial during pivotal movement of the rolloff frame relative to the base frame as described herein. Each plate 122 would include apertures 120 corresponding to the same apertures 120 passing through web 70. Additionally, a reinforcing plate 124 (see FIG. 13) may be added to the inner surface of track 102 to provide additional rigidity to track 102. An outer plate 125 (see FIG. 13) may be attached to the outer surface of track 102 to provide additional stiffening and spacing needs. In this manner, on activation of hydraulic cylinders 116, pistons 114 are advanced outwardly extending pins 110 outwardly through apertures 120 of web 70, tracks 102 and plates 124 and 125.

Referring still to FIGS. 9 and 10, the length of each plate 68 is selected to be approximately twice the length of the hinge system 100, in particular track 102. In this manner a hinge connection may be made at the most forward aperture 120A (as shown in FIG. 9) and plate 68 provides support for the entire length of track 102 forward of the hinge connection. Additionally, when the hinge connection is made at the most rearward aperture 120B (as shown in FIG. 10), plate 68 still provides support for the entire hinge system, that is the length of track 102.

OPERATION OF THE PRESENT INVENTION

Referring to FIG. 1, rolloff frame 28 is shown in the most forward position relative to base frame 26. In this position, the forward end 36 of rolloff frame 28 (including rollers 66) is in the position shown in FIG. 6. The connection at the rear ends of the base frame and the rolloff frame is hinged at the most forward aperture 120A as shown in FIG. 9. In this position rolloff frame 28 provides the optimum load distribution between the tractor axle and wheel assembly 34 of base frame 26 and the preferred height clearance. Alternatively, the operator may wish to locate the hinge connection in a different aperture 120. For load distribution reasons, or for other reasons, the hinge connection may be made at an intermediate aperture 120 between the most forward aperture 120A and the most rearward aperture 120B.

As discussed above in the forward position as shown in FIG. 1, rolloff frame 28 is restrained vertically relative to base frame 26 since rollers 66 in combination with members 64 have contacted plate 60 as generally shown in FIGS. 6 and 7. It will be apparent in view of this disclosure, however, that it is not necessary for rollers 66 and members 64 to advance to the most forward end of planar member 60 to provide this securing engagement. Rather, once the rollers 66 have entered opening 62, pivotal movement of rolloff frame 28 relative to base frame 26 is prohibited. The length of planar member 60, which defines opening 62, is selected to coincide with the maximum length of apertures 120. In other words, if the base frame 26 is manufactured with apertures 120 at six inch intervals over a distance of seven feet, it is preferable to create an opening 62 which is also seven feet in length thereby prohibiting pivotal movement of the rolloff frame relative to the base frame once the hinge connection has been disengaged from aperture 120B and the rolloff frame 28 begins to advance forward relative to base frame 26 within opening 62.

To begin the rearward movement of rolloff frame 28 the operator would first activate cylinders 116 so as to retract pins 110 from one of the more forward apertures 120, such as aperture 120A as shown in FIG. 9. Each pin 110 is retracted by retracting the corresponding piston 114 within its cylinder 116. Once this occurs, the rear ends of the base frame and the rolloff frame are disengaged. The operator would then retract piston 42 within cylinder 44 as shown in FIG. 2. In this manner, the rolloff frame is advanced rearwardly. With reference to FIG. 2, rollers 66 have been retracted from opening 62 of the forward end of the base frame (also shown in plan view in FIG. 4) thereby unlocking or disengaging the forward ends of the rolloff frame and the base frame.

The operator would then continue to advance the rolloff frame rearwardly until pins 110 are aligned with the most rearward aperture 120B of base frame 26 (see FIG. 10). Once each pin 110 is aligned with aperture 120B, cylinders 116 are activated advancing pistons 114 outwardly in a direction substantially normal to the longitudinal axis of members 48 and 54, thereby advancing each pin 110 through rear aperture 120B. In this manner, rolloff frame 28 is pivotally hinged to base frame 26. The operator would then activate hydraulic cylinders 44 extending pistons 42 as shown in FIG. 3. This would then cause rolloff frame 28 to pivot relative to base frame 26 about the hinged pivot at aperture 120B. Since the rolloff frame has been advanced rearwardly as shown in FIG. 10, a portion of rolloff frame 28 extends past the rear end of base frame 26 so that upon pivotal movement the most rearward end of rolloff frame 28 engages the ground surface. The rear edge 49 of rolloff frame 28 is preferably tapered to fully contact the ground surface. At that point, container 24 may be lowered gradually to the ground using a standard cable and winch arrangement attached at the forward end of the rolloff frame, well-known to those skilled in the art. The container would be unloaded in the direction of arrow 200 as shown in FIG. 3.

To load a container, the reverse procedure is followed. That is, with the apparatus beginning in the configuration as shown in FIG. 3, a cable with a hook (not shown) is attached to the forward end of container 24 and is gradually advanced forwardly onto the rolloff frame. Track member 25 on container 24 are permitted to engage rollers 52, and due to the vertical displacement of rollers 52 relative to members 48, the container is guided onto the top surface of the rolloff frame and correctly oriented. The operator then retracts pistons 42 within cylinders 44 lowering the rolloff frame from an inclined position as shown in FIG. 3 to a substantially horizontal position as shown in FIG. 2. Hydraulic cylinders 116 are then activated so as to retract pistons 114 thereby retracting pins 110 from the outermost aperture 120B. At this point, the rolloff frame is unhinged from the base frame. Cylinder 44 is then activated. Since there is no pivotal connection at the rear ends of the rolloff and the base frame, cylinders 44 move rolloff frame 28 forwardly relative to base frame 26 in a substantially horizontal position, advancing rollers 66 and members 64 of rolloff frame 28 into opening 62 of the forward end of base frame 26. The rolloff frame is advanced forward (i) a distance sufficient to engage and lock the forward end of the rolloff frame relative to the base frame prohibiting any pivotal movement, and (ii) a distance sufficient to redistribute the load. It is for this reason, that a plurality of apertures 120 are provided. When the desired aperture 120 is reached, cylinders 116 are activated extending pistons 114 and corresponding pins 110 through the desired aperture 120. The rolloff frame is then secured relative to the base frame. Pivotal movement is prohibited since the forward end of the rolloff frame is secured within the forward end of the base frame and the rear ends are connected through the hinge connection.

In accordance with the present invention, the operator may select the precise location for distribution of a load between the axle assembly of the tractor and the wheel assembly 34 of the base frame. This provides improved load distribution to meet federal, state or local road loading requirements. In addition, due to the inclination of planar member 60 and the tapered geometry of web 70 a base frame is providing which is smaller in height at its rear end 32 than at the other end of the member 54. In this manner, the rear end of trailer 20 may be reduced 6–8 inches in height which in turn lowers the center of gravity providing enhanced stability and additional clearance.

The present invention has been described in terms of a preferred embodiment. Obviously, modifications and alterations to this embodiment will be apparent to those skilled in the art in view of this disclosure. Therefore, it is intended that all such variations and equivalent modifications fall within the spirit and scope of the present invention as claimed.

What is claimed is:

1. A vehicle mounted rolloff hoist for loading, transporting and unloading containers comprising:

a base frame having a forward end and a rear end;

a displaceable rolloff frame having a forward end and a rear end and being releasably hinged at a pivot point proximate said rear end of said rolloff frame to said rear end of said base frame, said rolloff frame being adapted to rest upon said base frame and to support a container during loading, transporting and unloading;

a releasable and moveable hinge pivotally connecting said rolloff frame to said base frame and capable of releasing the pivotal connection enabling said rolloff frame to move substantially parallel to said base frame and relative thereto, said releasable hinge being adapted to reengage said rolloff frame to said base frame;

a single means for longitudinally displacing said rolloff frame relative to said base frame and for pivoting said rolloff frame relative to said base frame at said pivotal connection.

2. The rolloff hoist of claim 1 wherein said single means comprises hydraulic cylinders adapted to pivot said rolloff frame from a substantially horizontal position substantially parallel to said base frame to an inclined position relative to said horizontal position.

3. The rolloff hoist of claim 1 wherein said rolloff hoist further comprises means for securing the forward end of said rolloff frame to the forward end of said base frame when said rolloff frame is advanced toward a forward position substantially parallel to said base frame prohibiting said rolloff frame from pivoting relative to said base frame.

4. The rolloff hoist of claim 3 wherein said securing means comprises:

a planar member attached to the forward end of said base frame; and an engaging member attached proximate the forward end of said rolloff frame and adapted to contact said planar member as said rolloff frame advances toward the forward position.

5. A rolloff hoist for loading, transporting and unloading containers comprising:

a base frame having a longitudinal axis and having a forward end and a rear end and having track means substantially parallel with the longitudinal axis of said base frame;

a rolloff frame having a forward end and a rear end and track means substantially parallel with the longitudinal axis of said rolloff frame and being releasably hinged at a pivot point proximate said rear end of said rolloff frame to said rear end of said base frame, said rolloff frame being adapted to rest upon said base frame and to support a container during loading, transporting and unloading;

a releasable and moveable hinge pivotally connecting said rolloff frame to said base frame and capable of releasing the pivotal connection enabling said rolloff frame to move substantially parallel to said base frame and relative thereto, said releasable hinge being adapted to reengage said track means of said rolloff frame to said track means of said base frame in a forward position of said rolloff frame relative to said base frame; and a single means for pivoting said rolloff frame relative to said base frame at the pivotal connection and for longitudinally displacing said rolloff frame relative to said base frame.

6. The rolloff hoist of claim 5 wherein said single means comprises hydraulic cylinders adapted to pivot said rolloff frame from a substantially horizontal position substantially parallel to said base frame to an inclined position relative to said horizontal position.

7. The rolloff hoist of claim 5 wherein said rolloff hoist further comprises means for securing the forward end of said rolloff frame to the forward end of said base frame when said rolloff frame is substantially parallel to said base frame prohibiting said rolloff frame from pivoting relative to said base frame.

8. The rolloff hoist of claim 7 wherein said securing means comprises:

a planar member attached to the forward end of said base frame; and an engaging member attached proximate the forward end of said rolloff frame and adapted to contact said planar member as said rolloff frame advances forward to said base frame toward the forward position.

9. The rolloff hoist of claim 5 wherein said releasable hinge comprises:

a base frame having a pair of substantially parallel and elongated members adapted to engage said track means of said rolloff frame;

a connecting member attached to said track means of said rolloff frame proximate the rear end of said rolloff frame;

pin means attached to said connecting member, including a pin adapted to extend substantially normal to the longitudinal axis of said rolloff member through said track means of said base frame providing for the pivotal connection; and means for selectively advancing and retracting said pins substantially normal to the longitudinal axis of said rolloff frame permitting the releasable engagement of said rolloff frame from said base frame.

10. A rolloff hoist for loading, transporting and unloading containers, comprising:

a base frame having a longitudinal axis and having a forward end and a rear end and having track means substantially parallel with the longitudinal axis of said base frame;

a rolloff frame having a longitudinal axis and having a forward end and a rear end and track means substantially parallel with the longitudinal axis of said rolloff frame and adapted to be pivotally connected proximate said rear end of said rolloff frame to said rear end of said base frame, said rolloff frame being adapted to rest upon said base frame and to support a container during loading, transporting and unloading;

a releasable hinge pivotally connecting said rolloff frame to said base frame, having (i) a frame including elongated members adapted to engage said rolloff frame, (ii) a connecting member attached to said rolloff frame proximate the rear end of said rolloff frame, (iii) means for pivotally connecting said connector member to said base frame, and (iv) means for selectively engaging and releasing said pivoting means permitting the release of said rolloff frame from said base frame at a first position and the reengagement of said rolloff frame to said base frame at a second position; and a single means for pivoting said rolloff frame relative to said base frame at the pivotal connection and for longitudinally displacing said rolloff frame relative to said base frame.

11. A rolloff hoist for loading, transporting and unloading containers comprising:

a base frame having a longitudinal axis and having a forward end and a rear end and having track means substantially parallel with the longitudinal axis of said base frame;

a rolloff frame having a longitudinal axis and having a forward end and a rear end and track means substantially parallel with the longitudinal axis of said rolloff frame and being adapted to be pivotally connected proximate said rear end of said rolloff frame to said rear end of said base frame, said rolloff frame being adapted to rest upon said base frame and to support a container during loading, transporting and unloading;

a releasable hinge having (i) a frame including a pair of substantially parallel and elongated members adapted to engage said track means of said rolloff frame, (ii) a connecting member attached to said track means of said rolloff frame proximate the rear end of said rolloff frame, (iii) pin means adapted to extend a pin substantially normal to the longitudinal axis of said rolloff member through said track means of said base frame providing for the pivotal connection, and (iv) means for selectively advancing and retracting said pin substantially normal to the longitudinal axis of said rolloff frame permitting the release of said rolloff frame from said base frame at a first position and the reengagement of said rolloff frame to said base frame at a second position; and a single means for pivoting said rolloff frame relative to said base frame at the pivotal connection and for longitudinally displacing said rolloff frame relative to said base frame.

* * * * *